(12) United States Patent
Cheng et al.

(10) Patent No.: US 11,101,524 B2
(45) Date of Patent: Aug. 24, 2021

(54) METHOD FOR PREPARING LITHIUM-ION BATTERY SEPARATOR

(71) Applicant: Shanghai Energy New Materials Technology Co., Ltd., Shanghai (CN)

(72) Inventors: Alex Cheng, Shanghai (CN); Xiaoming Su, Shanghai (CN); Weiqiang Wang, Shanghai (CN); Fangbo He, Shanghai (CN); Yongle Chen, Shanghai (CN)

(73) Assignee: SHANGHAI ENERGY NEW MATERIALS TECHNOLOGY CO., LTD., Shanghai (CN)

( * ) Notice: Subject to any disclaimer, the term of this patent is extended or adjusted under 35 U.S.C. 154(b) by 238 days.

(21) Appl. No.: 16/082,711

(22) PCT Filed: Feb. 8, 2017

(86) PCT No.: PCT/CN2017/073087
§ 371 (c)(1),
(2) Date: Sep. 6, 2018

(87) PCT Pub. No.: WO2017/152731
PCT Pub. Date: Sep. 14, 2017

(65) Prior Publication Data
US 2019/0393463 A1   Dec. 26, 2019

(30) Foreign Application Priority Data
Mar. 7, 2016  (CN) .......................... 201610127268.0

(51) Int. Cl.
*B29C 55/16*  (2006.01)
*H01M 50/403*  (2021.01)
(Continued)

(52) U.S. Cl.
CPC ......... *H01M 50/403* (2021.01); *B29C 41/003* (2013.01); *B29C 55/005* (2013.01);
(Continued)

(58) Field of Classification Search
CPC ..... B29C 41/003; B29C 55/005; B29C 55/16; B29C 67/202; B29C 71/02
(Continued)

(56) References Cited

U.S. PATENT DOCUMENTS

2014/0159271 A1* 6/2014 Itou ......................... B29C 48/08
264/48

FOREIGN PATENT DOCUMENTS

CN    102241832       11/2011
CN    102569699 A      7/2012
(Continued)

OTHER PUBLICATIONS

International Search Report dated Apr. 28, 2017, for International Application No. PCT/CN2017/073087.
(Continued)

*Primary Examiner* — Jeffrey M Wollschlager
*Assistant Examiner* — Xue H Liu
(74) *Attorney, Agent, or Firm* — Burns & Levinson, LLP; Joseph M Maraia

(57) ABSTRACT

A method for preparing a lithium-ion battery separator is disclosed. The method comprises: cooling and shaping a liquid-phase stabilization system containing polyethylene, stretching to enlarge pores, extracting with a solvent, and heat-setting to obtain a lithium-ion battery separator, wherein the stretching includes pre-stretching and synchronous bidirectional stretching, and the pre-stretching is completed before the synchronous bidirectional stretching.

12 Claims, 2 Drawing Sheets

(51) Int. Cl.
*B29C 41/00* (2006.01)
*B29C 55/00* (2006.01)
*B29C 67/20* (2006.01)
*B29C 71/02* (2006.01)
*H01M 10/0525* (2010.01)
*H01M 50/411* (2021.01)
*B29L 31/34* (2006.01)

(52) U.S. Cl.
CPC ............ *B29C 55/16* (2013.01); *B29C 67/202* (2013.01); *B29C 71/02* (2013.01); *H01M 10/0525* (2013.01); *H01M 50/411* (2021.01); *B29K 2023/06* (2013.01); *B29L 2031/3468* (2013.01)

(58) Field of Classification Search
USPC .......................................................... 264/41
See application file for complete search history.

(56) References Cited

FOREIGN PATENT DOCUMENTS

| CN | 102850573 | | 1/2013 |
| CN | 102931371 | A | 2/2013 |
| CN | 103522550 | A | 1/2014 |
| CN | 103724951 | A | 4/2014 |
| CN | 103840113 | A | 6/2014 |
| CN | 104327351 | | 2/2015 |
| CN | 104327351 | A | 2/2015 |
| CN | 105552280 | | 5/2016 |
| JP | H06240036 | A | 1/1991 |
| JP | 2004083866 | A | 3/2004 |
| JP | 2005162773 | A | 6/2005 |
| WO | 2009084719 | A1 | 7/2009 |
| WO | 2013014986 | A1 | 1/2013 |
| WO | 2016024533 | A1 | 2/2016 |

OTHER PUBLICATIONS

Chinese First Office Action dated Jun. 28, 2017 in related Chinese Application No. 201610127268.0 (No English-language version available).
Chinese Second Office Action dated Mar. 19, 2018 in related Chinese Application No. 201610127268.0 (No English-language version available).
Notice of Reasons for Refusal dated Feb. 13, 2020, in related Japanese Application No. 2018-543309.
Korean Office Action for related Korean Application No. 10-2018-7027760 dated Apr. 28, 2020 (English Translation and Analysis Report provided).

\* cited by examiner

METHOD FOR PREPARING LITHIUM-ION BATTERY SEPARATOR

CROSS-REFERENCE TO RELATED APPLICATIONS

This application is the U.S. national phase entry under 35 U.S.C. § 371 of International Application No. PCT/CN2017/073087, filed Feb. 8, 2017, entitled METHOD FOR PREPARING LITHIUM-ION BATTERY SEPARATOR, which in turn claims priority to and benefit of Chinese Application No. 201610127268.0, filed Mar. 7, 2016, the contents of which are incorporated herein by reference in their entirety for all purposes.

TECHNICAL FIELD

The invention relates to electrochemical field, particularly to a method for preparing a lithium-ion battery separator.

BACKGROUND ART

Good chemical stability and excellent physical properties make microporous polyethylene films widely used in secondary lithium-ion batteries. Currently, there are mainly three kinds of processes for preparing microporous polyethylene films: the first process comprises processing polyolefin into fibrous form, and then processing the fibrous polyolefin into thin-film structure by a non-woven fabric process; the second process, which is a dry process, comprises melt extruding to obtain high crystalline and highly oriented polyolefin films, annealing to obtain a regular platelet structure, and high-temperature stretching to separate the platelets so as to obtain micropores; the third process, which is a wet process, i.e., TIPS (Thermally Induced Phase Separation) proposed by A. J. Castro, USA in 1981), wherein polyolefin and a filling agent are mixed at a high temperature to form a liquid-phase stabilization system, the polyolefin forms a solid phase during cooling while the filling agent remains in liquid phase, and the filling agent in the liquid phase is extracted using a solvent to form pores.

As electric vehicles being widely used in life, battery packs comprising relatively large number of lithium-ion batteries connected in series or in parallel have emerged, such battery packs require good consistency of lithium-ion batteries. At the same time, lithium-ion batteries comprise separators for separating positive and negative electrode materials, and their safety requirements are also very high; in addition, the consistency of physical properties such as thickness and the high strength of separators are also important indicators for quality measurement.

Currently, the mechanical strength of the separators is generally improved by using polyethylene with a higher molecular weight. However, the increased molecular weight of polyethylene tends to cause some disadvantageous effects, such as increased twin screw extrusion load, uneven mixture of polyethylene and filling agents, high load on the stretcher during stretching, non-uniform stretching, and slow stretching speed. These disadvantageous effects cause reduced production efficiency and decreased consistency of separators. In addition, excessively high molecular weight polyethylene may cause increased pore-closing temperature of separators, which also poses a safety hazard during the use of lithium-ion batteries.

Therefore, there is an urgent need in the art to find a new method for preparing lithium-ion battery separators, which method enables the resulting separators to have high mechanical strength and excellent consistency in physical and chemical properties and to meet safety requirements during the use of lithium-ion batteries, while maintaining high production efficiency.

SUMMARY OF THE INVENTION

The present invention aims at providing a method for preparing a lithium-ion battery separator and a lithium-ion battery separator manufactured by the method.

In a first aspect of the present invention, there is provided a method for preparing a lithium-ion battery separator, comprising the steps of:

step 1, forming a liquid-phase stabilization system containing polyethylene and a filling agent;

step 2: forming the liquid-phase stabilization system into a cast film with the liquid-phase filling agent in a cooling system;

step 3: subjecting the cast film to pre-stretching and then to synchronous bidirectional stretching, to form an intermediate film;

step 4: extracting the filling agent contained in the intermediate film by using an organic solvent to form a microporous polyethylene film; and step 5: heat-setting the microporous polyethylene film at a near melting temperature of the polyethylene to obtain the lithium-ion battery separator of the present invention.

In one embodiment, the pre-stretching is longitudinal stretching.

In another embodiment, the pre-stretching is performed at a temperature between 80° C. and 130° C.

In another embodiment, the stretching ratio of the pre-stretching is 1.01-6; more preferably 1.01-3.

In another embodiment, the synchronous bidirectional stretching includes transverse stretching and longitudinal stretching, and the stretching ratios of the transverse stretching and the longitudinal stretching are each 1.01 to 8, more preferably 4 to 8;

In another embodiment, the liquid-phase stabilization system contains 18 to 50 wt % of polyethylene and 50 to 82 wt % of filling agent. In another embodiment, the polyethylene has a weight average molecular weight of $2 \times 10^5$ to $3 \times 10^6$, more preferably $8 \times 10^5$ to $2 \times 10^6$; the boiling point of the filling agent is above 200° C.

In another embodiment, the organic solvent is an organic solvent that is miscible with the filling agent.

In another embodiment, the filling agent is selected from liquid paraffin oil, dioctyl phthalate, dibutyl phthalate, or a combination thereof.

In another embodiment, the near melting temperature of the polyethylene is 100-160° C., preferably 115-145° C.

In a second aspect of the present invention, there is provided the lithium-ion battery separator obtained by the preparing method according to the present invention as described above.

In a third aspect of the present invention, there is provided a use of the lithium-ion battery separator obtained by the preparing method according to the present invention as described above.

Accordingly, the present invention provides a novel method for preparing a lithium-ion battery separator; the method enables the resulting separator to have high mechanical strength and excellent consistency in physical and chemical properties and to meet safety requirements during the use of lithium-ion batteries, while maintaining high production efficiency.

EMBODIMENTS

Figure 1:
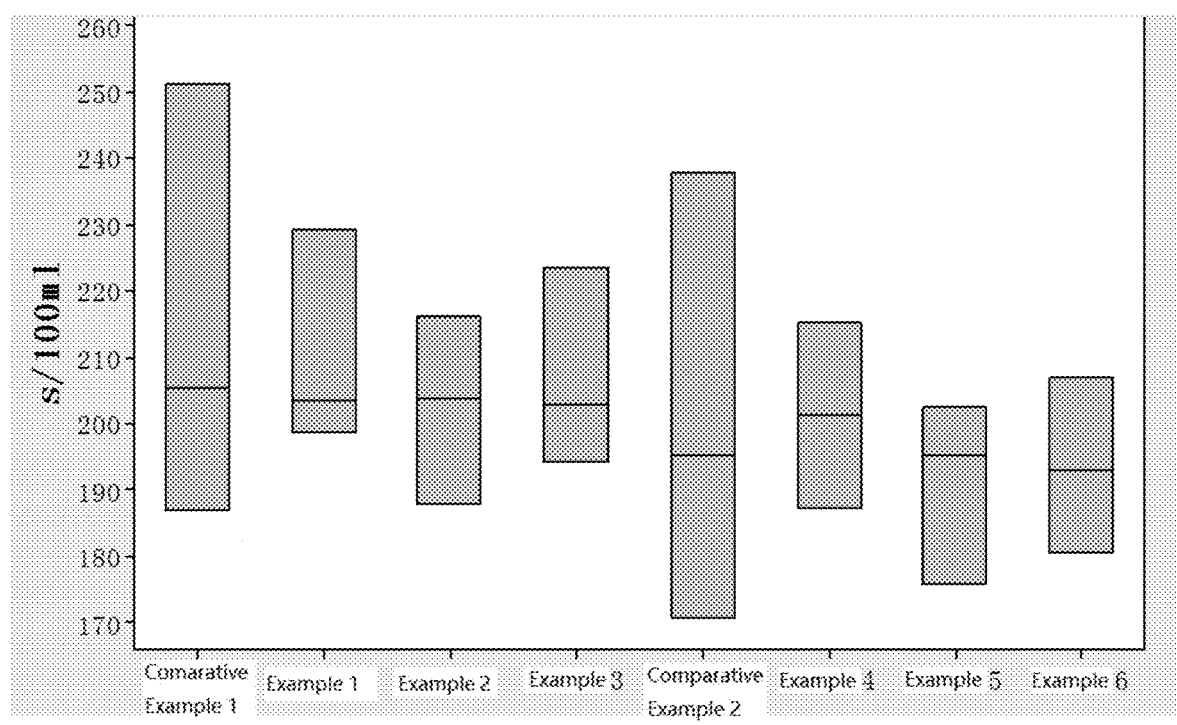
FIG. 1 is a boxplot of the longitudinal air permeability of the lithium-ion battery separators obtained according to the example of the present invention and a comparative example, respectively.

After extensive theoretical studies and production tests, the inventor found that the stretching manner and condition have an important effect on improving the mechanical strength and solving the consistency in physical and chemical properties in the manufacture of a lithium-ion battery separator by wet process. On such basis, the present invention has been completed.

Specifically, the method for preparing a lithium-ion battery separator provided by present invention comprises: cooling and shaping a liquid-phase stabilization system containing polyethylene, stretching to enlarge pores, extracting with a solvent, and heat-setting to obtain a lithium-ion battery separator, wherein the stretching includes pre-stretching and synchronous bidirectional stretching, and the pre-stretching is completed before the synchronous bidirectional stretching.

In an embodiment of the present invention, the method for preparing a lithium-ion battery separator comprises the steps of:

step 1: forming a liquid-phase stabilization system containing polyethylene and a filling agent;

step 2: forming the liquid-phase stabilization system obtained in the step 1 into a cast film with the liquid-phase filling agent in a cooling system;

step 3: subjecting the cast film obtained in the step 2 to pre-stretching and then to synchronous bidirectional stretching to form an intermediate film;

step 4: extracting the filling agent contained in the intermediate film obtained in the step 3 by using an organic solvent to form a microporous polyethylene film; and step 5: heat-setting the microporous polyethylene film obtained in the step 4 at a near melting temperature of the polyethylene to obtain the lithium-ion battery separator of the present invention.

In above step 1, the liquid-phase stabilization system containing polyethylene and a filling agent comprises 18 to 50 wt % of polyethylene and 50 to 82 wt % of a filling agent based on the total weight thereof. The polyethylene has a weight average molecular weight of $2 \times 10^5$ to $3 \times 10^6$, preferably $8 \times 10^5$ to $2 \times 10^6$, more preferably $8 \times 10^5$ to $1.6 \times 10^6$. The filling agent is a low molecular weight liquid organic substance with a molecular structure similar to polyethylene structure and having a boiling point above 200° C., for example, but not limited to, liquid paraffin oil, dioctyl phthalate, and dibutyl phthalate, and so on. The filling agent and the polyethylene form a thermodynamic single phase, i.e., a liquid-phase stabilization system, at a temperature under which polyethylene can be melted. Therefore, the temperature of forming liquid-phase stabilization system in the step 1 is generally in a temperature range within which the used polyethylene can be melted, typically in the range of 140-260° C. Step 1 can be accomplished by means of conventional equipment in the art, for example, but not limited to, extruding a mixture containing polyethylene and a filling agent by using a twin screw extruder, and the extrusion temperature is typically 150-250° C.

In a preferred embodiment of the present invention, the separator according to the present invention may further contain additives, for example, but not limited to: an antioxidant that mitigates or even prevents the oxidation of materials during processing (e.g. Antioxidant 1010, with a dosage of 0.1 to 0.5% by weight), an antistatic agent that can reduce static electricity of finished separator, and an X-RAY fluorescent agent, and the like.

In above step 2, a solution of polyethylene and filling agent in thermodynamic single phase (i.e. the liquid-phase stabilization system obtained in the step 1) is cooled in a cooling system to normal temperature (10-80° C., preferably 10-60° C., more preferably 10-40° C.) to form a cast film with the liquid-phase filling agent; a phase separation occurs between the polyethylene and the filling agent in the cast film, that is, the single phase formed in the early stage is divided into a polyethylene solid phase formed mainly of a polyethylene solidified lamella and a filling agent liquid phase. The formed cast film has a thickness of 400-1500 μm. A common cooling system may be used. In an embodiment of the present invention, a cooling system including a pressure roller is used to form the extruded melt into a cast film: a mixture containing polyethylene and a filling agent is extruded by using a twin screw extruder and sent to a cooling system; the gap between pressure rollers is adjusted and the corresponding pressure and thickness are controlled; and the effect of cooling quenching is adjusted by controlling the temperature of a contact roller and a cooling roller.

In the cast film obtained in the above step 2, the microporous structure of the polyethylene solid phase is filled with a filling agent liquid phase. In the above step 3, the microporous structure is expanded by stretching so that the filling agent is separated from the microporous structure.

In the above step 3, the pre-stretching is performed firstly, at a stretching ratio of 1.01-6, more preferably 1.01-3; and then the synchronous bidirectional stretching including transverse stretching and longitudinal stretching is performed, the stretching ratios of the transverse stretching and the longitudinal stretching are each 1.01 to 8, more preferably 4 to 8. In a preferred embodiment, the stretching ratios of the transverse stretching and the longitudinal stretching are the same or slightly different.

The pre-stretching is performed in longitudinal or transverse direction, preferably longitudinal direction. The bidirectional stretching is preferably synchronous bidirectional stretching, but the stretching ratios of the longitudinal stretching and the transverse stretching may be the same or different.

In this art, a longitudinal stretching generally refers to a stretching along the direction of film advancement; transverse stretching refers to a stretching perpendicular to the direction of film advancement; and synchronous bidirectional stretching refers to a stretching performed simultaneously in both longitudinal and transverse directions.

The stretching temperature can be adjusted within a certain range according to the specification of the film to be obtained and the stretching ratio. Generally, the range of the stretching temperature for adjustment can be set by referring to the Tm of the differential thermal analysis performed on the cast film obtained in the step 2 (there may be some deviations). The pre-stretching temperature is in the range of 80-130° C., preferably 90-120° C.; the synchronous bidirectional stretching temperature is in the range of 90-150° C., preferably 100-140° C.

The production speed of the pre-stretching ranges from 1 to 8 m/min; and the production speed of the synchronous bidirectional stretching ranges from 10 to 80 m/min.

Stretching may be performed using common equipment in the art, as long as the stretching requirements of the present invention can be met. That is, by pre-stretching and synchronous bidirectional stretching, the cast film forms a structure having uniform pore size after subjected to the pre-stretching and the synchronous bidirectional stretching. At the same time, the pre-stretching enables the film to have a certain molecular orientation, so that the strength of the entire film can be improved. The synchronous bidirectional stretching makes the pore size uniform, which can improve the consistency of permeability and mechanical strength.

The intermediate film formed in the above step 3 has a thickness of 10 to 50 µm, preferably 12 to 45 µm, more preferably 14 to 40 µm. The formed intermediate film is subjected to the above step 4, i.e., extracting the filling agent using an organic solvent to form a microporous polyethylene film having a uniform pore size.

The organic solvent may be any solvent capable of extracting the filling agent in the porous film, for example, but not limited to, methyl ethyl ketone, dichloromethane and isoamylene.

The extraction of filling agent includes, but is not limited to, one or more of impregnation, ultrasonic cleaning, diacolation, and the like. It is desired that the less filling agent remains after extraction the better. Up to 0.8 wt % of remaining filling agent is allowable on the basis of total weight of the microporous polyethylene film obtained.

In a preferred embodiment of the present invention, the filling agent is extracted by ultrasonic washing, then the amount of the remaining filling agent largely depends on the ultrasonic frequency and time for extraction. Considering thickness and organic solvent residues, generally an organic solvent with relatively high vapor pressure is utilized. In addition, the volatilization of organic solvents tends to take away heat, thus it is generally difficult to increase the speed of molecular motion by adjusting the temperature to improve the efficiency of extraction. Therefore, the efficiency of extraction is improved generally by ultrasonic principle and increased time. However, since the fluctuation ultrasonic wave tends to generate heat and bring safety hazards, the efficiency of extraction is generally improved by lengthening the distance across the extraction section. The extraction time depends on the film thickness. In the manufacture of a microporous film having a thickness of 10 to 30 µm, for example, the extraction time is preferably 2 to 4 minutes.

In the above step 5, the microporous polyethylene film obtained in the above step 4 is subjected to a heat-setting treatment to remove the residual stress and to reduce the shrinkage of the resulting film. By the heat-setting treatment, the pore structure of the film can be fixed, and then the film is heated to forcefully maintain the original shape of the film so as to eliminate residual stress. When the heat-setting temperature is high, the heat-setting time is relatively short; and when the heat-setting temperature is low, the heat-setting time is relatively long. However, when the heat-setting temperature is relatively high, the polyethylene tends to melt; and when the heat-setting temperature is relatively low, the processing time is too long. Preferably, within the crystallization temperature range of the polyethylene, the heat-setting time is 20 to 120 seconds. The heat-setting temperature ranges typically from 100 to 160° C., preferably 115 to 145° C.

The above features mentioned in the present invention or the features mentioned in the examples can be combined at will. All the features disclosed in the specification of the present application can be used in combination with any composition. Each feature disclosed in the specification can be replaced with any alternative feature that can provide identical, equivalent or similar purposes. Therefore, unless specified otherwise, the features disclosed herein are only general examples of identical or similar features.

The main advantages of the present invention are:
1. The lithium-ion battery separator product obtained by the manufacture method according to the present invention has high mechanical strength, and the micro pore sizes in the separator are uniform and controllable.
2. The present invention provides a lithium-ion battery separator with higher mechanical strength, not by using polyethylene with higher molecular weight, but with control on the intrinsic viscosity of polyethylene, to more efficiently achieve high-speed production.
3. The lithium-ion battery separator manufactured by the present invention is used for a lithium-ion battery, and can effectively decrease the short circuit generated during the processing, and can reduce the potential safety hazards during use, such as self-discharge and micro-short circuit.

The present invention will be further described hereinafter in combination with specific examples. It should be understood that these examples are used only to illustrate present invention and are not intended to limit the scope of present invention. The experimental method in the following examples whose specific condition is not specified are generally in accordance with conventional conditions or conditions recommended by manufacturers. Unless otherwise specified, all percentages, ratios, proportions, or parts are measured by weight.

The unit of weight-volume percent in the present invention is well known to those skilled in the art, and refers to, for example, the weight of a solute in a 100 ml solution.

Unless otherwise defined, all professional and scientific terms used herein have the same meaning as those familiar to the skilled person in the art. In addition, any methods and materials similar or equivalent to those described herein can be used in the method of the present invention. The preferred methods and materials described herein are for demonstration purposes only.

The intrinsic viscosity of polyethylene involved in the following examples of the present invention is determined according to the standard of "EN ISO 1628-3-2010 Plastics-Determination of the viscosity of polymers in dilute solution using capillary viscometers-Part 3: Polyethylenes and polypropylenes".

The steps, methods, and materials involved in the following examples include:

The polyethylene and the filling agent are mixed and extruded using a twin-screw extruder ($\varphi$=30 mm) at an extrusion temperature of 150 to 250° C. for a residence time of 3 minutes, and the melt extruded from the trapezoidal die is formed into a sheet having a thickness of 400 to 1500 µm (i.e. a cast film) using a cooling system including a pressure roller.

The sheet is analyzed by DSC to assess the melting of the crystalline part under different temperature conditions. The analysis instrument is a differential scanning calorimeter (DSC) produced by Mettler with a sample weight of 10 mg±2 mg and a heating rate of 10° C./min.

In the present invention, the stretching ratio, the temperature and the speed are controlled by improving the stretching system section, wherein the stretching temperature may depend on the results of DSC test.

The filling agent can be extracted directly using a ultrasonic washer for experiment: a stretched intermediate film sample with a size of 15 cm×15 cm is placed in the washer and extracted with dichloromethane filling agent; ultrasonic washings are carried out for several times and each washing lasts for 10 min, and the amount of the residual filling agent in the sample is measured after each washing until the difference in the amount of the residual filling agent in the sample after two consecutive washings does not exceed 10%, then it is considered that the extraction of the filling agent is completed, and the total washing time when the previous washing in the two consecutive washings is completed is taken as the actual extraction time.

The film (microporous polyethylene film) after extracting the filling agent is placed in an oven with multi-section temperature setting; and the baking temperature and the time of different sections are set according to the requirements of production, thereby the heat-setting process is completed.

The physical and chemical properties of the separator are measured, such as, tensile strength, pin puncture strength, liquid absorption rate, liquid retention rate, porosity, air permeability, thermal shrinkage, thickness.

The method of measuring the liquid absorption rate is as follows: a piece of 40 mm×60 mm lithium-ion battery separator manufactured by the present invention is immersed completely in an electrolyte solution for one hour, and the liquid absorption rate is calculated by weighing the weight before and after the immersion.

The method of measuring the liquid retention rate is as follows: a lithium-ion battery separator manufactured by the present invention is impregnated with an electrolyte solution, then the separator is placed under a normal temperature and normal humidity condition for one hour, and the liquid retention rate is calculated by weighing the weight before and after the placement.

Thickness: GB/T 6672-2001 ISO 4593:1993. The thickness test is performed using a Marr thickness gauge.

Tensile strength: GB 6672-2001. A sample having a width of 15 mm is tensiled using a universal tensile tester at a speed of 200 mm/min.

Pin puncture strength: the force needed to puncture the product with a φ1 mm pin at a certain speed.

Air permeability: the time required for 100 ml air to pass through a φ1 inch circular cross-section in Curley test.

Porosity: the porosity of the sample separator is measured by gravimetric method: [(raw material density×sample area×sample thickness)−sample weight]/(raw material density×sample area×sample thickness).

Thermal shrinkage: testing according to GB/T 2027-2004.

Example 1

Polyethylene having a weight average molecular weight of $1.4 \times 10^6$ to $1.6 \times 10^6$ was used as component I, and a paraffin oil having a kinematic viscosity of (7-8) $mm^2/s$ at 100° C. was used as component II (filling agent). The contents of component I and component II were 30 wt % and 70 wt %, respectively.

The pre-stretching was performed at a temperature of 103° C. with a stretching ratio of 1.2; the synchronous bidirectional stretching was performed at a temperature of 125° C. with a longitudinal stretching ratio of 5 and a transverse stretching ratio of 6.

Example 2

Polyethylene having a weight average molecular weight of $1.4 \times 10^6$ to $1.6 \times 10^6$ was used as component I, and a paraffin oil having a kinematic viscosity of (7-8) $mm^2/s$ at 100° C. was used as component II (filling agent). The contents of component I and component II were 30 wt % and 70 wt %, respectively.

The pre-stretching was performed at a temperature of 98° C. at a stretching ratio of 1.5; the synchronous bidirectional stretching was performed at a temperature of 120° C. with a longitudinal stretching ratio of 4 and a transverse stretching ratio of 6.

Example 3

Polyethylene having a weight average molecular weight of $1.4 \times 10^6$ to $1.6 \times 10^6$ was used as component I, and a paraffin oil having a kinematic viscosity of (7-8) $mm^2/s$ at 100° C. was used as component II (filling agent). The contents of component I and component II were 30 wt % and 70 wt %, respectively.

The pre-stretching was performed at a temperature of 88° C. at a stretching ratio of 2; the synchronous bidirectional stretching was performed at a temperature of 115° C. with a longitudinal stretching ratio of 3 and a transverse stretching ratio of 6.

Example 4

Polyethylene having a weight average molecular weight of $8 \times 10^5$ to $1 \times 10^6$ was used as component I, and a paraffin oil having a kinematic viscosity of (7-8) $mm^2/s$ at 100° C. was used as component II (filling agent). The contents of component I and component II were 30 wt % and 70 wt %, respectively.

The pre-stretching was performed at a temperature of 103° C. at a stretching ratio of 1.2; the synchronous bidirectional stretching was performed at a temperature of 125° C. with a longitudinal stretching ratio of 5 and a transverse stretching ratio of 7.5.

Example 5

Polyethylene having a weight average molecular weight of $8 \times 10^5$ to $1 \times 10^6$ was used as component I, and a paraffin oil having a kinematic viscosity of (7-8) $mm^2/s$ at 100° C. was used as component II (filling agent). The contents of component I and component II were 30 wt % and 70 wt %, respectively.

The pre-stretching was performed at a temperature of 98° C. at a stretching ratio of 1.5; the synchronous bidirectional stretching was performed at a temperature of 120° C. with a longitudinal stretching ratio of 4 and a transverse stretching ratio of 7.5.

Example 6

Polyethylene having a weight average molecular weight of $8 \times 10^5$ to $1 \times 10^6$ was used as component I, and a paraffin oil having a kinematic viscosity of (7-8) mm²/s at 100° C. was used as component II (filling agent). The contents of component I and component II were 30 wt % and 70 wt %, respectively.

The pre-stretching was performed at a temperature of 88° C. at a stretching ratio of 2; the synchronous bidirectional stretching was performed at a temperature of 115° C. with a longitudinal stretching ratio of 3 and a transverse stretching ratio of 7.5.

Comparative Example 1

Polyethylene having a weight average molecular weight of $1.4 \times 10^6$ to $1.6 \times 10^6$ was used as component I, and a paraffin oil having a kinematic viscosity of (7-8) mm²/s at 100° C. was used as component II (filling agent). The contents of component I and component II were 30 wt % and 70 wt %, respectively.

The cast film passed through the pre-stretching roller but did not subject to any pre-stretching, and subjected to synchronous bidirectional stretching directly; the synchronous bidirectional stretching was performed at a temperature of 130° C. with a longitudinal stretching ratio of 6 and a transverse stretching ratio of 6.

Comparative Example 2

Polyethylene having a weight average molecular weight of $8 \times 10^5$ to $1 \times 10^6$ was used as component I, and a paraffin oil having a kinematic viscosity of (7-8) mm²/s at 100° C. was used as component II (filling agent). The contents of component I and component II were 30 wt % and 70 wt %, respectively.

The cast film passed through the pre-stretching roller but did not subject to any pre-stretching, and subjected to synchronous bidirectional stretching directly; the synchronous bidirectional stretching was performed at a temperature of 130° C. with a longitudinal stretching ratio of 6 and a transverse stretching ratio of 7.5.

TABLE 1

| | | | Examples 1-6 | | | | | |
|---|---|---|---|---|---|---|---|---|
| | | | | | Examples | | | |
| manufacture conditions and test results | | units | 1 | 2 | 3 | 4 | 5 | 6 |
| Pre-stretching (longitudinal) | Stretching temperature | ° C. | 103 | 98 | 88 | 103 | 98 | 88 |
| | Stretching ratio | — | 1.2 | 1.5 | 2 | 1.2 | 1.5 | 2 |
| Synchronous bidirectional stretching | Stretching temperature | ° C. | 115 | 110 | 105 | 120 | 115 | 110 |
| | Longitudinal stretching ratio | — | 5 | 4 | 3 | 5 | 4 | 3 |
| | Transverse stretching ratio | | 6 | 6 | 6 | 7.5 | 7.5 | 7.5 |
| Thickness | | μm | 12 | 12 | 12 | 12 | 12 | 12 |
| Thickness Cpk | | — | 1.92 | 1.87 | 1.83 | 1.96 | 1.82 | 1.71 |
| Tensile strength | MD | kgf/cm2 | 1671 | 1715 | 1770 | 1692 | 1735 | 1816 |
| | TD | kgf/cm2 | 1542 | 1530 | 1523 | 1687 | 1576 | 1627 |
| Pin puncture strength | | gf | 415 | 448 | 476 | 424 | 457 | 483 |
| Air permeability | | sec/100 ml | 209 | 203 | 207 | 202 | 192 | 194 |
| Porosity | | % | 40 | 41 | 43 | 41 | 42 | 44 |
| Liquid absorption rate | | % | 95 | 108 | 110 | 94 | 109 | 115 |
| liquid retention rate | | % | 85 | 88 | 90 | 87 | 91 | 93 |
| 105° C. thermal shrinkage | MD % | | 2.76 | 2.82 | 2.75 | 2.82 | 2.75 | 2.62 |
| | TD % | | 0.09 | 0.12 | 0.13 | 0.13 | 0.15 | 0.14 |

TABLE 2

| | Comparative Examples 1-2 | | | |
|---|---|---|---|---|
| | | | | Comparative Examples |
| manufacture conditions and test results | | units | 1 | 2 |
| Pre-stretching | Temperature | ° C. | 108 | 108 |
| | ratio | — | No | No |
| Synchronous bidirectional stretching | Stretching temperature | ° C. | 120 | 125 |
| | Longitudinal ratio | — | 6 | 6 |
| | Transverse ratio | | 6 | 7.5 |
| Thickness | | μm | 12 | 12 |
| Thickness Cpk | | — | 1.76 | 1.85 |
| Tensile strength | MD | kgf/cm2 | 1430 | 1493 |
| | TD | kgf/cm2 | 1365 | 1461 |
| Pin puncture strength | | gf | 397 | 390 |
| Air permeability | | sec/100 ml | 206 | 196 |
| Porosity | | % | 38 | 39 |
| Liquid absorption rate | | % | 88 | 92 |
| liquid retention rate | | % | 82 | 83 |
| 105° C. thermal shrinkage | MD | % | 2.89 | 2.73 |
| | TD | % | 0.14 | 0.15 |

As can be seen from the results in Tables 1 and 2, the separators obtained in Examples 1-6 have significantly higher tensile strength and pin puncture strength than the separators obtained in Comparative Examples 1-2. The results of Tables 1 and 2 showed that by adding pre-stretching before synchronous bidirectional stretching, and controlling the stretching ratio and stretching temperature of the pre-stretching and synchronous bidirectional stretching (the separator gauge was 12 μm in the examples), the present invention tends to achieve a film having a smooth appearance and a uniform thickness after the pre-stretching and the synchronous bidirectional stretching, which contributes to form a film with higher mechanical strength, and can be used in various lithium-ion batteries.

TABLE 3 boxplot data of air permeability in the examples and the comparative examples

| | Comparative Example1 | Example 1 | Example 2 | Example 3 | Comparative Example2 | Example 4 | Example 5 | Example 6 |
|---|---|---|---|---|---|---|---|---|
| Sample size | 100 | 100 | 100 | 100 | 100 | 100 | 100 | 100 |
| Maximum | 251 | 229 | 216 | 224 | 238 | 215 | 203 | 207 |
| Minimum | 187 | 199 | 188 | 195 | 171 | 187 | 176 | 181 |
| Range | 64 | 30 | 28 | 29 | 67 | 28 | 27 | 26 |
| CPK | 1.34 | 1.64 | 1.58 | 1.55 | 1.36 | 1.61 | 1.56 | 1.52 |
| Average | 206 | 209 | 203 | 207 | 196 | 202 | 192 | 194 |

FIG. 1 and Table 3 showed the results of the air permeability of the separators obtained in the examples and the comparative examples (wherein the heights of the rectangular bars indicate the distribution of the results of the air permeability in each of the examples and the comparative examples). As can be seen from FIG. 1 and table 3, the separators of Examples 1 to 6 have significantly smaller air permeability distribution range than the separators of Comparative Examples 1-2; therefore, the results in FIG. 1 and table 3 indicate that the performance consistency of the product is significantly improved by pre-stretching.

Figure 2A:
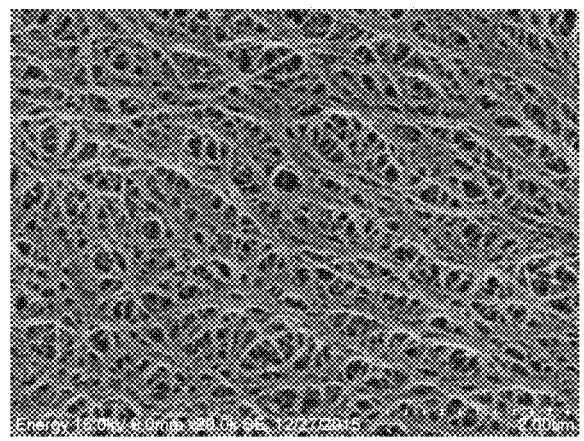
FIG. 2A is an SEM image of a lithium-ion battery separator (Comparative Example 1) obtained without pre-stretching.
Figure 2B:
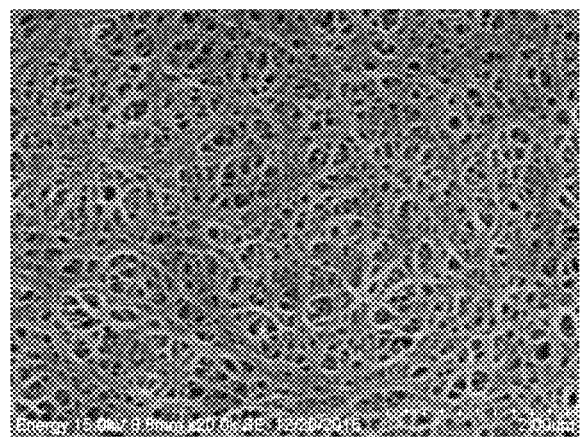
FIG. 2B is an SEM image of a lithium-ion battery separator (Example 1) obtained by pre-stretching.

FIG. 2A is an SEM image of a lithium-ion battery separator obtained without pre-stretching (Comparative Example 1); FIG. 2B is an SEM image of a lithium-ion battery separator obtained by pre-stretching (Example 1). As can be seen by comparing FIGS. 2A and 2B, the consistency of the pore size of the film that undergoes pre-stretching is significantly improved.

The above descriptions are merely preferred embodiments of the present invention, and are not intended to limit the scope of the substantive technical content of the present invention. The substantive technical content of the present invention is defined broadly within the scope of the claims of the present application. Any technical entity or method performed by another person, if it is exactly the same as defined in the scope of the claims of the present application, or an equivalent modification, will be deemed to be covered by the scope of the claims.

The invention claimed is:

1. A manufacture method for preparing a lithium-ion battery separator, consisting of the following steps:
    forming a liquid-phase stabilization system containing polyethylene and a liquid-phase filling agent;
    forming the liquid-phase stabilization system into a cast film with the liquid-phase filling agent in a cooling system;
    subjecting the cast film to pre-stretching and then to synchronous bidirectional stretching to form an intermediate film;
    extracting the filling agent contained in the intermediate film by using an organic solvent to form a microporous polyethylene film; and
    heat-setting the microporous polyethylene film at a near melting temperature of 100-160° C. to obtain the lithium-ion battery separator;
    wherein a stretching ratio of the pre-stretching is 1.01 to 6; and
    wherein the synchronous bidirectional stretching includes transverse stretching and longitudinal stretching, and stretching ratios of the transverse stretching and the longitudinal stretching are each 1.01 to 8.

2. The manufacture method according to claim 1, wherein the pre-stretching is a longitudinal stretching.

3. The manufacture method according to claim 1, wherein the pre-stretching is performed at a temperature of 80° C. to 130° C.

4. The manufacture method according to claim 1, wherein the stretching ratio of the pre-stretching is 1.01-3.

5. The manufacture method according to claim 1, wherein the stretching ratios of the transverse stretching and the longitudinal stretching are each 4-8.

6. The manufacture method according to claim 1, wherein the liquid-phase stabilization system contains 18-50 wt % of the polyethylene and 50-82 wt % of the filling agent.

7. The manufacture method according to claim 1, wherein the polyethylene has a weight average molecular weight of $2 \times 10^5$ to $3 \times 10^6$.

8. The manufacture method according to claim 1, wherein the filling agent has a boiling point above 200° C.

9. The manufacture method according to claim 1, wherein the filling agent is selected from the group consisting of liquid paraffin oil, dioctyl phthalate, dibutyl phthalate or a combination thereof.

10. The manufacture method according to claim 1, wherein the organic solvent is an organic solvent that is miscible with the filling agent.

11. The manufacture method according to claim 1, wherein the organic solvent is selected from the group consisting of methyl ethyl ketone, dichloromethane, isoamylene or a combination thereof.

12. The manufacture method according to claim 1, wherein the temperature for heat-setting the microporous polyethylene film is 115-145° C.

* * * * *